UNITED STATES PATENT OFFICE.

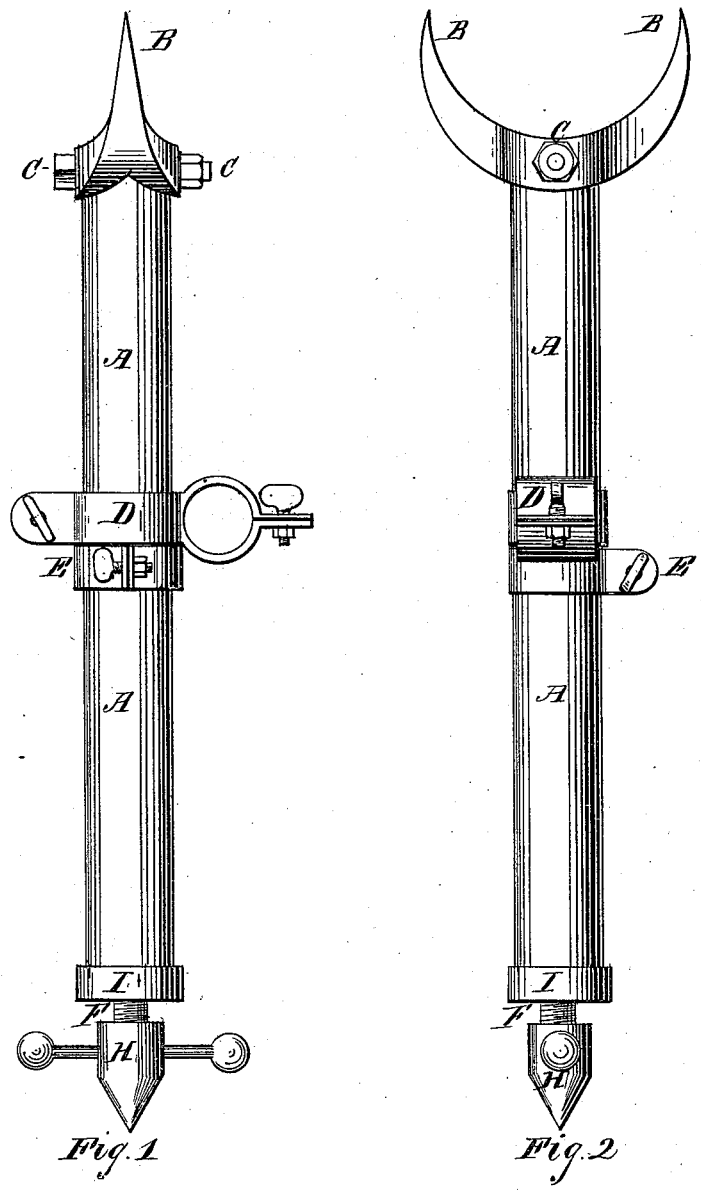

DE VOLSON WOOD, OF HOBOKEN, NEW JERSEY.

IMPROVEMENT IN COLUMNS FOR SUPPORTING ROCK-DRILLING MACHINES.

Specification forming part of Letters Patent No. 187,077, dated February 6, 1877; application filed September 6, 1873.

*To all whom it may concern:*

Be it known that I, DE VOLSON WOOD, of the city of Hoboken, in the county of Hudson, in the State of New Jersey, have invented a new and useful Improvement in Columns for Supporting a Rock-Drilling Machine, of which the following is a full and exact description of the same, reference being had to the accompanying drawing, forming part of this specification.

The object of my invention is to make a portable column for supporting a rock-drilling machine for working in the heading of a drift or tunnel, or other similar rock-excavation, and which can be managed without being mounted on wheels.

A A is a hollow column, which I make of gas-pipe, or other similar material, and which has a nut, I, and screw F at one end, and a claw, B B, at the other. The claw has two feet, B B, which project beyond the ends of the column A A, and is secured to it by a single bolt or pin, C. The chief object of this arrangement is to permit the claw to adjust itself to the inequalities of the rock, which it will do by turning or rocking on the pin C any required amount. The column is secured in place by forcing the claw B B against the rock by means of the screw F, and when thus secured the claw will prevent the column from turning on its axis. It is advisable to place a block of wood, or other partially-elastic substance, between the end H of the screw and the rock.

The claw B B may be secured to the end of the column in a slot in the column, or to an extension of the column, or in any other equivalent manner, so that it may be self-adjustable.

D is a clamp, of any suitable form, for securing the machine to the column. A collar, E, is secured to the column just under the clamp D, for the purpose of supporting the clamp and machine in any desired place on the column when the clamp is unbolted. By this arrangement the clamp and machine may be turned about the column as an axis, without any danger of its slipping down on the column.

I claim—

The auxiliary clamp for supporting the main clamp, when the latter is free to turn, so that the machine and main clamp may be turned around on the column, in the manner and for the purposes specified.

DE VOLSON WOOD.

Witnesses:
WM. FLETCHER,
F. H. BRANDIS.